United States Patent
Dutta

(10) Patent No.: US 11,770,465 B2
(45) Date of Patent: Sep. 26, 2023

(54) SUPPORTING MULTIPLE TRANSPORT OPTIONS FOR BORDER GATEWAY PROTOCOL

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 24 days.

(21) Appl. No.: 17/075,471

(22) Filed: Oct. 20, 2020

(65) Prior Publication Data

US 2022/0124186 A1 Apr. 21, 2022

(51) Int. Cl.
*H04L 69/24* (2022.01)
*H04L 45/52* (2022.01)
*H04L 69/326* (2022.01)

(52) U.S. Cl.
CPC .............. *H04L 69/24* (2013.01); *H04L 45/52* (2013.01); *H04L 69/326* (2013.01)

(58) Field of Classification Search
CPC ........ H04L 69/24; H04L 45/52; H04L 69/326
See application file for complete search history.

(56) References Cited

U.S. PATENT DOCUMENTS

| | | | | |
|---|---|---|---|---|
| 7,885,294 B2 * | 2/2011 | Patel | ....................... | H04L 45/04 370/386 |
| 8,516,148 B2 * | 8/2013 | Dubois | ................. | H04L 45/247 709/238 |
| 9,391,885 B1 * | 7/2016 | Shukla | .................... | H04L 45/66 |
| 9,729,414 B1 * | 8/2017 | Oliveira | ................ | H04L 43/062 |
| 9,781,032 B1 * | 10/2017 | Shukla | .................... | H04L 45/50 |
| 2006/0262734 A1 * | 11/2006 | Appanna | ............... | H04L 45/121 370/254 |

(Continued)

FOREIGN PATENT DOCUMENTS

EP    1 392 026 A2    2/2004

OTHER PUBLICATIONS

Bates et al., "Multiprotocol Extensions for BGP-4", Network Working Group, RFC 4760, Jan. 2007, 12 pages.

(Continued)

*Primary Examiner* — Mohamed A. Wasel
(74) *Attorney, Agent, or Firm* — Tong, Rea, Bentley & Kim, LLC

(57) ABSTRACT

A first router transmits a first message including information identifying a first set of transport layer protocols supported by the first router. The first router receives a second message including information identifying a second set of transport layer protocols supported by a second router. A common transport layer protocol is selected from a subset of transport layer protocols that are common to the first and second sets of transport layer protocols. The first router then establishes a border gateway protocol (BGP) session with the second router over the common transport layer protocol. The first message is unicast to the second router or broadcast/multicast over a plurality of links to a plurality of routers that includes the second router. In some cases, the common transport layer protocol is selected by the router having a higher priority, based on preferences, or a combination thereof.

21 Claims, 10 Drawing Sheets

(56) References Cited

U.S. PATENT DOCUMENTS

| | | | |
|---|---|---|---|
| 2008/0031239 | A1 | 2/2008 | Kapoor et al. |
| 2009/0052452 | A1* | 2/2009 | Patel ............... H04L 45/04 370/392 |
| 2012/0158976 | A1* | 6/2012 | Van der Merwe .... H04L 45/033 709/228 |
| 2015/0078378 | A1* | 3/2015 | Wijnands ............ H04L 45/74 370/390 |
| 2015/0213631 | A1* | 7/2015 | Vander Broek ..... G06F 16/2477 345/589 |
| 2016/0182358 | A1* | 6/2016 | Peter ............... H04L 12/185 370/315 |
| 2019/0068503 | A1* | 2/2019 | Wei ............... H04L 47/11 |
| 2020/0112611 | A1 | 4/2020 | Smit et al. |
| 2021/0234944 | A1* | 7/2021 | Wang ............... H04L 69/24 |
| 2022/0052946 | A1* | 2/2022 | Dutta ............... H04L 45/507 |

OTHER PUBLICATIONS

Fang et al., "BGP-4 message transport over SCTP", Inter-Domain Working Group, Internet Draft, May 10, 2009, 11 pages.

Friedl et al., "Transport Layer Security (TLS) Application-Layer Protocol Negotiation Extension", Internet Engineering Task Force (IETF), RFC 7301, Jul. 2014, 9 pages.

Iyengar et al., "QUIC: A UDP-Based Multiplexed and Secure Transport", QUIC, Internet-Draft, Jun. 10, 2020, 187 pages.

Rekhter et al., "A Border Gateway Protocol 4 (BGP-4)", Network Working Group, RFC 4271, Jan. 2006, 104 pages.

Stewart, "Stream Control Transmission Protocol", Network Working Group, RFC 4960, Sep. 2007, 152 pages.

"Transmission Control Protocol", DARPA Internet Program, RFC 793, Sep. 1981, 89 pages.

Xu et al., "BGP Neighbor Discovery", Network Working Group, Internet-Draft, Nov. 26, 2019, 33 pages.

U.S. Appl. No. 17/030,085, filed Sep. 23, 2020, listing Pranjal Kumar Dutta as inventor, entitled "Targeted Neighbor Discovery for Border Gateway Protocol".

U.S. Appl. No. 16/911,980, filed Jun. 25, 2020, listing Pranjal Kumar Dutta as inventor, entitled "Multilayer Tunneling of Protocols Over QUIC".

EP Search Report mailed in corresponding EP Application No. 21198093.3 dated Mar. 15, 2022, 9 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Version    |     Type      |        Message Length         |
+-+-+-+-+-+-+-+-+-+-+-+-+-+-+-+-+-+-+-+-+-+-+-+-+-+-+-+-+-+-+-+-+
|                           AS number                           |
+-+-+-+-+-+-+-+-+-+-+-+-+-+-+-+-+-+-+-+-+-+-+-+-+-+-+-+-+-+-+-+-+
|                         BGP Identifier                        |
+-+-+-+-+-+-+-+-+-+-+-+-+-+-+-+-+-+-+-+-+-+-+-+-+-+-+-+-+-+-+-+-+
```

FIG. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Version    |     Type      |        Message Length         |
+-+-+-+-+-+-+-+-+-+-+-+-+-+-+-+-+-+-+-+-+-+-+-+-+-+-+-+-+-+-+-+-+
|                           AS number                           |
+-+-+-+-+-+-+-+-+-+-+-+-+-+-+-+-+-+-+-+-+-+-+-+-+-+-+-+-+-+-+-+-+
|                         BGP Identifier                        |
+-+-+-+-+-+-+-+-+-+-+-+-+-+-+-+-+-+-+-+-+-+-+-+-+-+-+-+-+-+-+-+-+
|      Adjacency Hold Time      |     Flags     |   Reserved    |
+-+-+-+-+-+-+-+-+-+-+-+-+-+-+-+-+-+-+-+-+-+-+-+-+-+-+-+-+-+-+-+-+
|                             TLVs                              |
+-+-+-+-+-+-+-+-+-+-+-+-+-+-+-+-+-+-+-+-+-+-+-+-+-+-+-+-+-+-+-+-+
```

SUPPORTING MULTIPLE TRANSPORT OPTIONS FOR BORDER GATEWAY PROTOCOL

BACKGROUND

Field of the Disclosure

The border gateway protocol (BGP) is a control plane protocol for exchanging routing information over networks, e.g., between autonomous systems (ASes). The BGP peering between a pair of BGP routers is referred to as a BGP session and the peering BGP routers can be directly connected or connected over multiple hops in the network. A BGP session between two routers in the same AS is referred to as an internal BGP (i-BGP) and a BGP session between routers in different ASes is referred to as an external BGP (e-BGP), which is used as an exterior gateway protocol to exchange routing information among the different ASes. A BGP session runs as an application over the transmission control protocol (TCP), which provides lossless, reliable, and in-order delivery of BGP messages in the BGP session. The peering BGP routers exchange keep-alive messages at predetermined time intervals to maintain the liveliness of the session. Many different types of information are transmitted using BGP sessions. For example, a BGP session can exchange thirty or more different types of network layer reachability information (NLRI) including NLRI types that are used to set up layer-3 communications, layer-2 virtual private networks (VPNs), multiprotocol label switching (MPLS) over label switched paths (LSPs), and the like. The distribution and characteristics of the packets that convey different NLRI over a BGP session are not necessarily uniform, e.g., the NLRI serve different purposes for different applications and require different levels of priority over a convergence time.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 4 is a message header for a border gateway protocol (BGP) user datagram protocol (UDP) message according to some embodiments.

FIG. 5 is a BGP Hello message according to some embodiments.

FIG. 6 is a flag field according to some embodiments.

DETAILED DESCRIPTION

Figure 1:
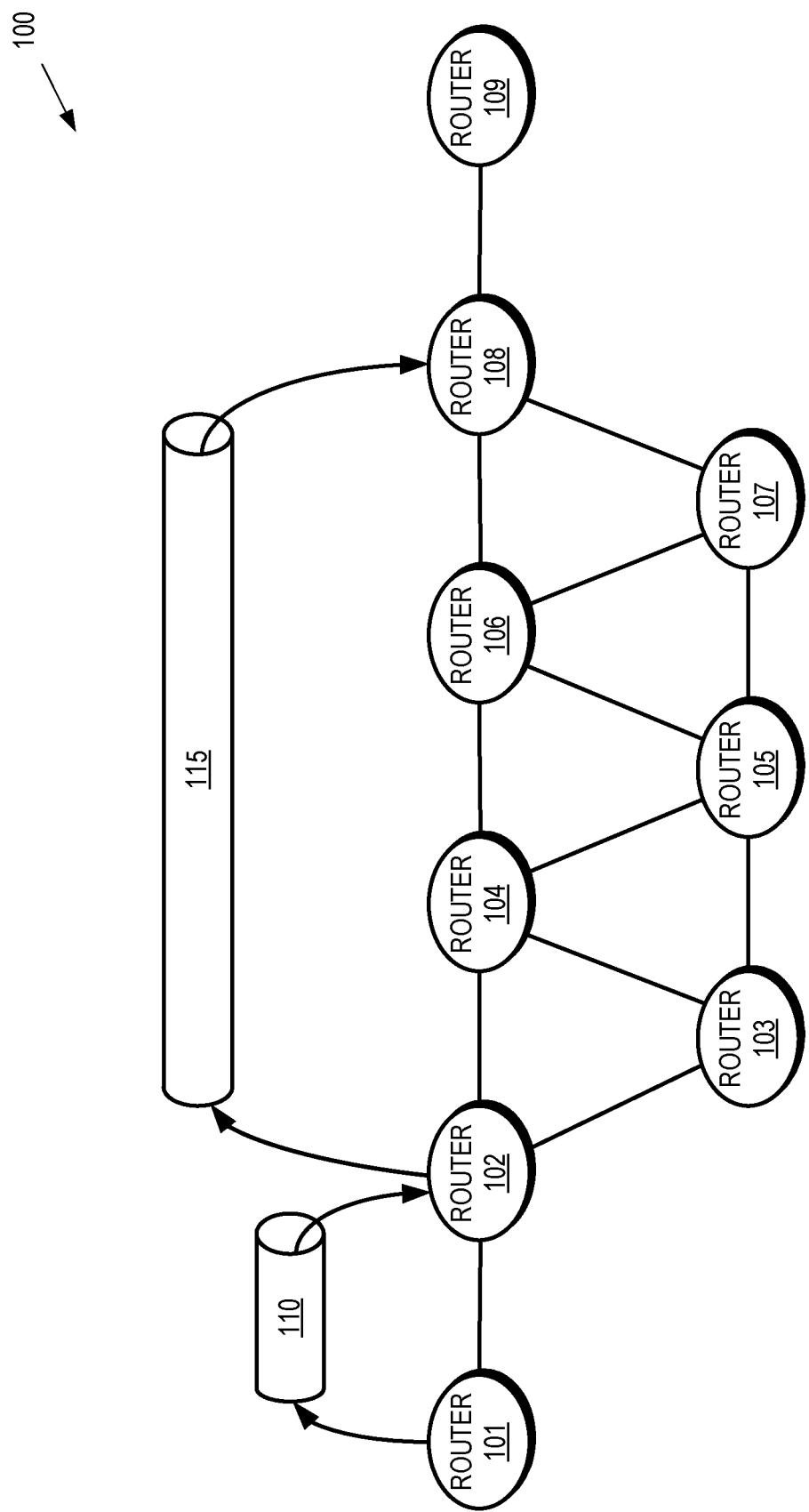
FIG. 1 is a block diagram of a network supports multiple transport layer protocols for border gateway protocol (BGP) sessions according to some embodiments.

Head-of-line (HOL) blocking is a significant problem in conventional BGP deployments. For example, a delay or congestion in transmitting TCP packets for one type of NLRI affects the TCP packets for all the other NLRI types conveyed over the BGP session because the BGP session uses a single TCP connection. Furthermore, the single TCP connection allows low priority NLRI packets to block higher priority NLRI packets, which leads to HOL blocking. This problem can be ameliorated by establishing different BGP sessions over different TCP connections for each NLRI type. However, this approach is not scalable because of the large numbers of BGP sessions and corresponding TCP connections that are formed. For example, if a router supports twelve NLRI types and has BGP sessions to fifty peers, providing separate BGP sessions and TCP connections for each NLRI type would require 600 BGP sessions and 600 TCP connections.

Several protocols are more efficient than TCP. For example, the performance of connection-oriented applications is improved using the QUIC protocol (note that QUIC is not an acronym) or Stream Control Transmission Protocol (SCTP) to establish a set of multiplexed sub-connections (also referred to herein as streams) over a single connection between two endpoints. Supporting multiple streams over a single connection allows the data conveyed by the different streams to reach an endpoint of the connection independently, and hence independent of packet losses or delays involving other streams. The QUIC and SCTP protocols do not require ordering dependency among packets in the streams and these protocols perform error correction and loss recovery independently on different streams. Thus, the HOL blocking delays experienced in TCP do not occur between different streams because lost or delayed packets in one stream do not affect the packets being conveyed in other streams of the connection. Congestion and flow control are applied independently to the streams in a QUIC or SCTP connection. Either endpoint of a QUIC or SCTP connection can initiate a stream in the connection at any time without requiring any handshake to start the stream. The streams can be bidirectional or unidirectional. In addition to reliable delivery and congestion control on a per-stream basis, QUIC integrates a security protocol. The initial QUIC handshake process includes the exchange of security keys and supported security protocols, thus speeding up the connection set-up process.

Despite the potential benefits of transport layer protocols other than TCP, such as QUIC and SCTP, conventional BGP sessions cannot be implemented using protocols other than TCP and do not support protocol negotiation to select a preferred protocol option from among a set of protocols. These constraints also prevent conventional BGP sessions from being transported over security protocols such as the transport layer security (TLS) cryptographic protocols. The aforementioned drawbacks in conventional BGP impact numerous network scenarios including service provider networks and data centers used for cloud-based computing.

Many data centers leverage BGP as an underlay routing protocol that supports flexible policy-based routing among a set of interconnected routers that receive information from clients, distribute the information to the appropriate servers, collect information from the servers, and forward the collected information back to the clients. For example, the routers can be deployed in a Clos topology that creates a leaf-and-spine system of interconnected leaf routers and spine routers. BGP is preferable to other link-state routing protocols such as open shortest path first (OSPF, OSPFv3) and intermediate system-to-intermediate system (IS-IS) because these link-state protocols force all traffic between a source and a destination to follow the same path. Leaf routers are allocated different autonomous system numbers (ASNs) and a single ASN is allocated to all the spine routers in the spine. BGP sessions are formed between the entities associated with each ASN. To form BGP sessions, a BGP router performs neighbor discovery to determine a neighbor Internet protocol (IP) address and an AS for each BGP neighbor on all links of the BGP router, as well as generating and distributing information such as the router's AS, the liveliness of the neighbor routers/spines, link attributes such as addresses, a maximum transfer unit (MTU), and the like. The BGP router initiates neighbor discovery by multicasting a "Hello" message on all its links. The Hello message includes the ASN and the BGP identifier of the router, hold time for the Hello message, and, in some cases, one or more Type-Length-Values (TLVs) to represent other parameters. Neighboring BGP routers establish a TCP connection in response to one of the BGP routers receiving a Hello message from the other BGP router and establishing an adjacency between the BGP routers. The BGP session is then established over the top of the TCP connection.

Service provider networks often establish BGP sessions between routers that are separated by multiple hops. Multi-hop BGP neighbor discovery is performed using targeted neighbor discovery messages unicast by routers performing targeted neighbor discovery. For example, a first router receives a targeted neighbor discovery message that is unicast from a second router that is multiple hops away from the first router. The targeted neighbor discovery message includes an IP address that is monitored by the first router and transport layer parameters, as well as an ASN and BGP identifier of the second router. Examples of the transport layer parameters include IP addresses for a transport layer connection between the first and second routers.

The first router evaluates the transport layer parameters and, if the parameters are acceptable, forms a targeted adjacency with the second router. As used herein, the term "acceptable" refers to parameters that are shared by or compatible with the operation of the first and second routers. For example, the second router can transmit information indicating parameters such as timeout intervals and the first router determines that the proposed parameters are acceptable if they are the same as the parameters implemented in the first router or can be used to configure operation of the first router. A transport layer connection is established based on the negotiated transport layer parameters in response to forming the targeted adjacency.

FIGS. 1-14 disclose techniques for selecting a transport layer protocol from a candidate set of transport layer protocols to support a border gateway protocol (BGP) session by exchanging messages during neighbor discovery that include information identifying sets of transport layer protocols that are available as candidate transport layer protocols for the routers involved in the BGP session. In some embodiments, a first router transmits a first neighbor discovery message (sometimes referred to as a Hello message) that includes information identifying a first set of transport layer protocols supported by the first router. The message is broadcast or multicast over all links between the first router and other routers in the network (including a second router) or the message is unicast to the second router via a single link/hop or multiple links/hops using a targeted Hello message. The first router receives a second neighbor discovery message from the second router. The second neighbor discovery message includes information identifying a second set of transport layer protocols supported by the second router. A transport layer protocol is selected from a subset of transport layer protocols that are common to the first and second sets. In some embodiments, the first and second sets of transport layer protocols are ordered based on preferences of the first and second routers, respectively, and the transport layer protocol having the highest preference in the subset of common transport layer protocols is selected for the BGP session. In some embodiments, the first and second routers are prioritized based on first and second identifiers, respectively, and the highest priority router selects the transport layer protocol. For example, if the first router has a higher BGP identifier than the second router, the first router chooses the transport layer protocol having the highest preference for the first router to support the BGP session. Examples of transport layer protocols that operate as underlay protocols for the BGP session include, but are not limited to, a transmission control protocol (TCP), QUIC, stream control transmission protocol (SCTP), and a transport layer security (TLS) protocol.

In response to successfully negotiating a transport layer protocol, the routers establish a BGP session over the negotiated transport layer protocol. Configuration of the BGP session is performed based on the parameters of the negotiated transport layer protocol. For example, if the negotiated transport layer protocol is a QUIC protocol or SCTP protocol that supports multiple streams, the routers map different NLRI types, sets of features, or other characteristics to separate streams in the QUIC or SCTP connection. Transport layer packets associated with the different NLRI types or sets of features are conveyed over different streams based on the mapping. The streams independently apply packet loss/recovery techniques and congestion control to the packets. The HOL blocking between different NLRI types or sets of features is therefore eliminated. Furthermore, security protocols can be selectively applied to the streams based on the requirements of the NLRI types or sets of features that are conveyed by the streams of the QUIC connection.

In some embodiments, BGP is used as an exterior gateway protocol to exchange routing information among ASes. In other embodiments, BGP is used as a control plane protocol in large scale data centers to support network virtualization overlays, e.g., virtual extensible LAN (VXLAN), network virtualization using generic routing encapsulation (NVGRE), and MPLS over user datagram protocol (MPLSoUDP) based overlays. BGP can also be leveraged as an underlay routing protocol instead of link-state routing protocols like IS-IS and OSPF in some large-scale data centers. Conventional link state protocols compute paths using a Shortest-Path-First (SPF) algorithm. Consequently, all traffic between a source and a destination follows the same SPF path, which does not provide the flexibility of routing required within a data center. In a data center, the network topologies grow (scale out horizontally) frequently due to the continual addition of servers and other systems into the network. BGP supports policy-based routing so that traffic can be routed along different paths based on policies associated with different types of traffic. This aspect of BGP is one reason for its deployment as the underlay routing protocol in data centers. Some embodiments of BGP also support link-state and SPF capabilities like IS-IS and OSPF.

FIG. 1 is a block diagram of a network 100 supports multiple transport layer protocols for border gateway protocol (BGP) sessions according to some embodiments. The network 100 includes a set of routers 101, 102, 103, 104, 105, 106, 107, 108, 109, which are collectively referred to herein as "the routers 101-109." The routers 101-109 establish sessions for communication based on the BGP, is a widely used control plane protocol to exchange routing information, especially between autonomous systems (ASes). Some embodiments of BGP are extended to support the exchange of network layer reachability information (NLRI) that is used to set up different types of layer-3, layer-2 virtual private networks (VPNs), multiprotocol label switching (MPLS) over label switched paths (LSPs), and the like. The extended version of BGP is referred to as a Multi-Protocol BGP (MP-BGP), The routers 101-109 use the information exchanged via BGP to establish BGP peering between a pair of BGP routers. The BGP peering is also referred to as a BGP session. The peering BGP routers can be directly connected or could be multiple hops away. In the illustrated embodiment, the BGP session 110 between the routers 101 and 102 is a single-hop session because the routers 101, 102 are directly connected by a link. The BGP session 115 between the routers 102 and 108 is a multi-hop session because the BGP session 115 traverses multiple routers, e.g., the routers 104, 106.

The BGP sessions 110, 115 run as applications over a transport layer protocol that is negotiated during setup of the BGP sessions 110, 115. Examples of the transport layer protocols that can be negotiated during setup of the BGP sessions 110, 115 include, but are not limited to, the QUIC protocol, a Stream Control Transmission Protocol (SCTP), the transmission control protocol (TCP), Transport Layer Security (TLS) and the like.

To negotiate the transport layer protocol for the BGP session 110, the router 101 transmits a first message including information identifying a first set of transport layer protocols supported by the router 101. The first message can be unicast to the router 102 or broadcast/multicast to a set of routers that include the router 102. In response to receiving the first message, the router 102 generates a second message including information identifying a second set of transport layer protocols supported by the router 102. The second message is transmitted to the router 101. A common transport layer protocol is selected from a subset of transport layer protocols that are common to the first and second sets of transport layer protocols. In some embodiments, the initiating router 101 selects the common transport layer protocol and in other embodiments the receiving router 102 selects the common transport layer protocol, e.g., based on priorities or preferences associated with the routers 101, 102, as discussed herein. The router 101 then establishes the BGP session 110 with the second router over the common transport layer protocol. To negotiate the transport layer protocol for the BGP session 115, the router 101 can transmit a targeted message to the router 108 that identifies the first set of transport layer protocols. The transport layer protocol used by the BGP session 115 is then selected from a subset of transport layer protocols that is common to the first set and a third set supported by the router 108.

After a BGP session is established, the peering routers exchange reachability information (as messages) over the BGP session. In some embodiments, a BGP router periodically sends 19-byte keep-alive messages every 60 seconds to maintain the session. A BGP session between two routers in the same autonomous system (AS) is referred to as Internal BGP or Interior Border Gateway Protocol (i-BGP). A BGP session between routers in different ASes is referred to as an External BGP or Exterior Border Gateway Protocol (e-BGP).

Figure 2:
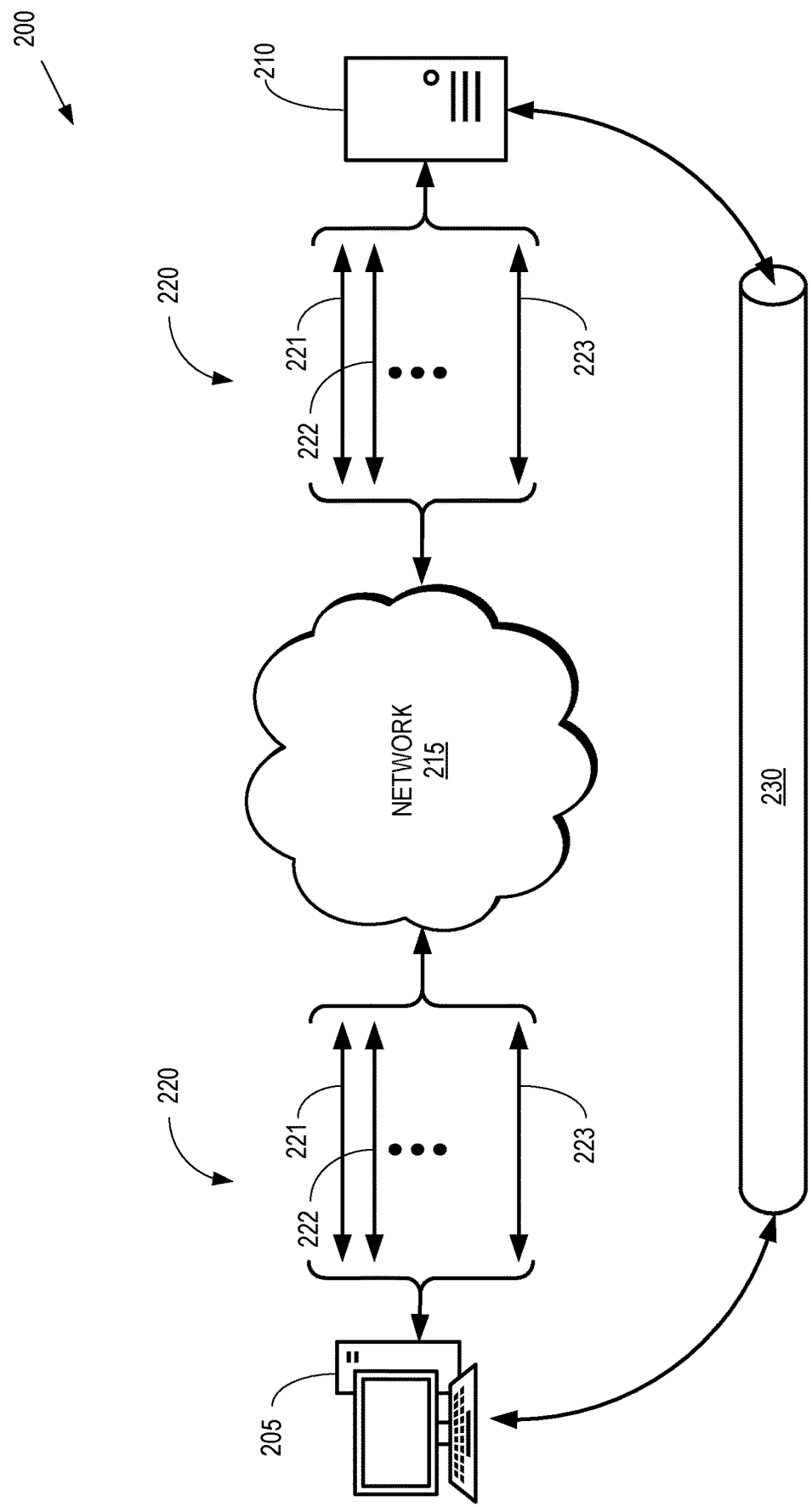
FIG. 2 is a block diagram of a communication system that supports tunneling data from multiple protocols at multiple layers over a QUIC connection according to some embodiments.

FIG. 2 is a block diagram of a communication system 200 that supports tunneling data from multiple protocols at multiple layers over a QUIC connection according to some embodiments. The communication system 200 includes a client 205 and a server 210 that communicate via a network 215. The client 205 and the server 210 have established a QUIC connection 220 that includes streams 221, 222, 223, which are collectively referred to herein as "the streams 221-223." Note that the reference numerals associated with the QUIC connection 220 refer to portions of the QUIC connection 220 on both sides of the network 215. Although three streams 221-223 are shown in FIG. 2, the QUIC connection 220 can include any number of streams and the streams can be established by either the client 205 or the server 210 at any time during the lifetime of the QUIC connection 220.

Stream identifiers are allocated to the streams by the client 205 and the server 210. In some embodiments, the client 205 and the server 210 observe stream identifier parity. For example, the client 205 uses even numbers as stream identifiers and the server 210 uses odd numbers as stream identifiers. The parity of the stream identifiers allows QUIC to spawn new streams at the client 205 or the server 210 without the need to undergo negotiations between each side to decide on a stream identifier. The QUIC streams support unidirectional and bidirectional streams and the directionality of the streams 221-223 is determined by setting the second-to-least significant bit in the stream identifier to a value indicating the directionality. For example, a bit value of (0) indicates a unidirectional stream and a bit value of (1) indicates a bidirectional stream. The bit reservations allow the streams 221-223 to be started at any time during the lifetime of the connection 220 without the need for negotiation. The client 205 and the server 210 are restricted to non-overlapping ranges of stream identifiers, thus avoiding stream identifier negotiations to avoid conflicts.

Information in the streams 221-223 is transmitted on a single-stream-per-packet basis (datagram mode) or by aggregating bytes from multiple streams 221-223 into a packet. If a QUIC packet transmitted over the QUIC connection 220 is dropped, every stream in that packet is blocked. For example, if a packet transmitted over the QUIC connection 220 includes bytes from the streams 221 and 222, both streams 221 and 222 are blocked if the packet is dropped. The QUIC implementation in the client 205 and the server 210 determines the number of streams sent per packet to limit the occurrences of blocking. The QUIC implementation trades off the flexibility of sending data for multiple streams in a single packet with the chance multiple streams are blocked when a dropped packet occurs. Once an endpoint of a stream has finished transmitting data, the endpoint sets a FIN bit on its last stream frame or the frame after the last stream frame to indicate the stream is closed in the direction of the endpoint, resulting in a half closed stream. Once both endpoints have sent stream frames with the FIN bit set, the stream is fully closed.

In some embodiments, one or more of the streams 221-223 of the QUIC connection 220 are used to support a BGP session 230. To establish the BGP session 230, the client 205 and the server 210 negotiate a version of a QUIC protocol that is supported for a QUIC connection 220 between the client 205 and the server 210. The client generates a cryptographic handshake (e.g. according to TLS) and embeds an extension in the cryptographic handshake. The extension includes a structure that indicates a set of protocols supported by the client 205 at a set of layers. The client 205 and the server 210 negotiate parameters of the BGP session 230 and then establish the BGP session 230 based on the negotiated parameters, as discussed herein.

Figure 3:
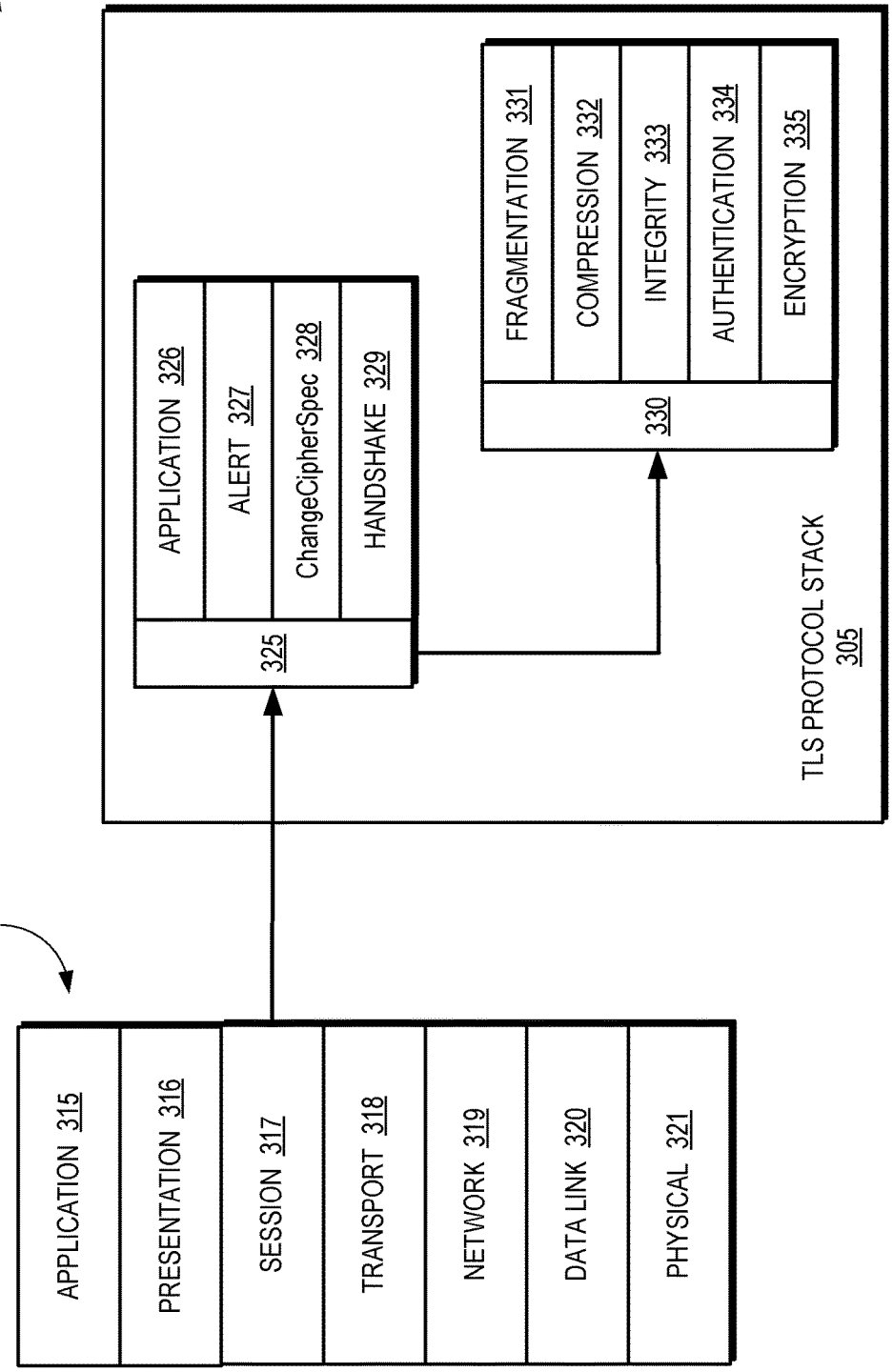
FIG. 3 is a block diagram illustrating a protocol stack that includes a transport layer security (TLS) protocol stack according to some embodiments.

FIG. 3 is a block diagram illustrating a protocol stack 300 that includes a TLS protocol stack 305 according to some embodiments. In the illustrated embodiment, the TLS protocol stack 305 is implemented in the context of an Open System Interconnect (OSI) model 310 that includes several protocol layers. An application layer 315 is closest to the end-user and can interact directly with a software application or program. The application layer performs functions including identifying communication partners, determining resource availability, and synchronizing communication. A presentation layer 316 establishes a context between application layer entities and, in some cases provides a mapping between the syntax and semantics used by the different entities. A session layer 317 establishes, manages, and terminates connections between local and remote applications. In the illustrated embodiment, the TLS protocol stack 305 is implemented as part of the session layer 317. A transport layer 318 provides functionality to support transfers of variable length data sequences from a source to a destination host while maintaining quality-of-service (QoS), reliability, and air control. A network layer 319 provides functionality to transfer the variable-length data sequences between nodes connected to different networks. A data link layer 320 supports node-to-node data transfer between directly connected nodes. Some embodiments of the data link layer 320 are subdivided into a media access control (MAC) layer and a logical link control (LLC) layer. A physical layer 321 is responsible for transmission and reception of unstructured raw data between a device and a physical transmission medium, e.g., by converting digital bits into electrical, radio, or optical signals.

TLS is a cryptographic protocol designed to provide communications security over a computer network. TLS finds widespread use in applications such as web browsing, email, instant messaging, voice over IP (VoIP), etc. Websites can use TLS to secure communications between their servers and web browsers. TLS falls into the session layer in the seven-layer OSI model of computer networking. However, in some embodiments, TLS is considered a transport layer protocol for BGP sessions. TLS operates on top of a reliable transport layer protocol such as TCP and has also been adapted to run over datagram protocols such as UDP. The Datagram Transport Layer Security (DTLS) protocol is based on the TLS protocol and provides similar security guarantees while preserving the datagram delivery model.

The TLS protocol is designed to provide three services to applications running over the TLS protocol: encryption, authentication, and data integrity.

Encryption: A mechanism to obfuscate what is sent from one computer to another.

Authentication: A mechanism to verify the validity of the provided identification material.

Integrity: A mechanism to detect message tampering and forgery.

The TLS protocol stack 305 includes a protocol stack 325 that includes an application layer 326, an alert layer 327, a layer 328 for changing a cipher specification, and a handshake layer 329. The TLS protocol stack 305 also includes a record 330 that includes information or parameters indicating fragmentation 331, compression 332, integrity 333, authentication 334, and encryption 335. The values of the parameters in the record 330 are used to create messages for transmission according to the TLS protocol.

As discussed herein, BGP neighbor discovery techniques are leveraged to support multiple transport protocol options for BGP sessions. In some embodiments, a BGP router directly discovers BGP neighbors connected by a link or hop using UDP based Hello messages that are broadcast/multicast on every link connected to the BGP router. In the message, the UDP destination port is encoded as "179" and a destination address in an IP header of the message is encoded as "all routers on this subnet" group multicast address (e.g., using the destination address 224.0.0.2 in the IPv4 case and FF02::2 in the IPv6 case). The IP source address is set to the address of the interface over which the message is sent out. In some embodiments, a BGP router discovers BGP neighbors that are multiple hops away using targeted BGP Hello messages. A BGP router listens on a local IP address for Hello Messages from potential neighbors that are multiple routing hops away. For every potential multi-hop neighbor, the BGP router is configured to unicast periodic Hello messages to the IP address in the neighbor on which the neighbor is listening for Hello messages. These Hello messages are called "Targeted Hellos". The Targeted Hello messages carry various parameters for the negotiation of a multi-hop BGP session.

A BGP Hello message includes the following:
ASN and BGP Identifier of the sender router.
Hold Time specifying the time the receiving BGP router maintains its record of Hellos from the sending BGP router without receipt of another Hello.
(Optionally) TLVs (Type-Length-Value format) describing various other parameters, such as TCP connection-specific parameters, and the like.

Upon receipt of a Hello message from a neighbor, a BGP router negotiates the parameters included in the message. If the parameters are acceptable, then a targeted adjacency is formed with the neighbor. After formation of the targeted adjacency, the BGP connection is established over a negotiated transport layer protocol such as TCP, QUIC, TLS, or TCP. Thus, neighbor discovery can be performed irrespective of whether a neighbor is directly connected or multiple hops away. In order to support transport layer protocol negotiation, the Hello messages transmitted from the BGP routers include an additional parameter called "transport options." The transport options parameter includes a list of reliable transport protocols ordered by their preferences. An example of a transport options parameters that can be included in a Hello message is {quic, sctp, tls, tcp}, which indicates that QUIC is the first preference, SCTP is the second preference, TLS is the third preference and TCP is the fourth/last preference.

When a first BGP router receives a Hello message from a second BGP router that includes a transport options field, a transport protocol is chosen based on the highest common preference with respect to the transport preferences of the BGP router with the lower BGP Identifier. For example, if the first BGP router has the lower BGP identifier compared to the second BGP router and the first BGP router sent transport options {quic, sctp, tls, tcp} in its Hellos. In response to transmitting the Hello message, the first BGP router receives a Hello message including a transport options field {sctp, quic, tls, tcp} from the second BGP router. In that case, all the listed protocols are common between the first and second BGP routers. Since the first BGP router has a lower BGP Identifier, the set of common preferences with respect to its tunnel preferences is: {quic, sctp, tls, tcp}. Both the BGP routers therefore choose the highest preference protocol, QUIC, as transport protocol for the BGP session. For another example, suppose the first BGP router sent transport options {quic, sctp, tls, tcp} in its Hello message and received {sctp, tcp} in the Hello message from second BGP router. The first BGP router has a lower BGP identifier, so the set of common preferences with respect to its transport options is {sctp, tcp}. In that case, SCTP is chosen by both BGP routers for setting up the BGP session.

In response to successfully negotiating the transport layer protocol, a connection is established between the BGP routers over the negotiated transport layer protocol. The transport protocol indicates BGP as the user application. If the transport protocol supports multi-streaming (such as QUIC or SCTP), then each BGP router independently maps an NLRI type or a set of features to an independent stream in the connection (in that case streams are unidirectional). This eliminates the HOL between NLRI types or competing features. Some embodiments of the techniques disclosed herein are backward compatible with previous BGP implementations. In a pair of peering BGP routers, if the first BGP router has implemented negotiation of transport layer protocols and included the transport options in the Hello messages sent from the first BGP router but the second BGP router has not included transport options in Hello messages sent from the second BGP router, then the transport protocol negotiation mechanism falls back to use TCP as the transport protocol.

FIG. 4 is a message header 400 for a BGP user datagram protocol (UDP) message according to some embodiments. The BGP neighbor discovery mechanism operates using UDP messages with destination port "179" and uses the format of shown in the message header 400. The fields in the message header 400 are:
  Version: This 1-octet unsigned integer indicates the protocol version number of the message. The current BGP version number is 4.
  Type: The type of BGP message. A Hello message is assigned type 1.
  Message Length: This 2-octet unsigned integer specifies the length in octets of the entire BGP UDP message including the header 400.
  AS number: the AS Number of the UDP message sender.
  BGP Identifier: the BGP Identifier of the UDP message sender.
BGP UDP messages can be sent using either IPv4 or IPv6 depending on the address.

FIG. 5 is a BGP Hello message 500 according to some embodiments. The first 12-octets of the BGP Hello message 500 are the common header 400 shown in FIG. 4. The remaining fields in the BGP Hello message 500 are:
  Adjacency Hold Time: Hello adjacency hold time in seconds. Adjacency Hold Time specifies the time, for which the receiving BGP neighbor router SHOULD maintain adjacency state for it, without receipt of another Hello. A value of 0 means that the receiving BGP peer should immediately mark that the adjacency to the sender is going down.
  Flags: Current defined bits as shown in FIG. 6. Other bits should be cleared by the sender and are ignored by the receiver.
  Reserved: this field should be set to 0 by sender and is ignored by receiver.
  TLVs: This field contains one or more TLVs (Type-Length-Value).

FIG. 6 is a flags field 600 according to some embodiments. The flags field 600 is used in some embodiments of the BGP hello message 500 shown in FIG. 5. In the illustrated embodiment, the flags field 600 includes an S bit that indicates that this is a State Change Hello message when SET and a normal periodic Hello message when CLEAR. Based on the setting of the S flag, there are two variants of the Hello message:
  1) State Change Hello Message: these Hello messages include TLVs that convey the state and parameters of the local interface and adjacency to other routers on the link. They are generated only in response to a change in state of the adjacency or some parameter at the interface level.
  2) Periodic Hello Message: these are the normal periodic Hello messages which do not include TLVs and are used to maintain the adjacency on the link during steady-state conditions.

Figure 7:
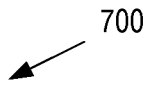
FIG. 7 is a common Type-Length-Value (TLV) format according to some embodiments.

FIG. 7 is a common Type-Length-Value (TLV) format 700 according to some embodiments. The TLV format 700 is used in some embodiments of the BGP hello message 500 shown in FIG. 5.

The fields in the TLV format 700 are:
  Type—16-octet field that indicates the type of TLV.
  Length—16-octet field that indicates length of the Value field in units of octets.
  Value: The variable sized type dependent value field. A Hello Message carries one or more of the following six TLVs.
Accepted ASN List TLV
  An optional TLV that is used to signal an unordered list of AS numbers from which the BGP router would accept BGP sessions. When not signaled, it indicates that the router will accept BGP peering from any ASN from its neighbors. Indicating the list of ASNs, helps avoid the neighbor discovery process getting stuck in a 1-way state where one side keeps attempting to setup adjacency while the other does not accept it due to incorrect ASN.
Peering Address TLV
  The Peering Address TLV is used to indicate to the neighbor the address to be used for setting up the BGP TCP session. Along with the peering address, the router can specify its supported route types (AFI/SAFI(s)). When the AFI/SAFI values are specified as 0/0, then it indicates that the neighbor can attempt for negotiation of any AFI/SAFIs. Multiple instances of this TLV MAY be included in the Hello message, one for each peering address (e.g. IPv4 and IPv6 or multiple IPv4 addresses for different AFI/SAFI sessions).
Local Prefix TLV
  BGP neighbor discovery mechanism, in certain scenarios, requires a BGP router to program a route in its local routing table for a prefix belonging to its neighbor router. On such scenario is when the BGP TCP peering is to be setup between the loopback addresses on the neighboring routers. This requires that the routers have reachability to each other's loopback addresses before the TCP session can be brought up. The Local Prefix TLV is an optional TLV which enables a BGP router to explicitly signal its local prefix to its neighbor for setting up of such a local routing entry pointing over the underlying link over which it is being signaled.

Link Attributes TLV

The Link Attributes TLV is a mandatory TLV in a State Change Hello message that signals to the neighbor the link attributes of the interface on the local router. One and only one instance of this TLV MUST be included in the State Change Hello message. A State Change Hello message without this TLV included MUST be discarded and an error logged for the same. This TLV enables a BGP router to learn all its neighbor's IP addresses on the specific link as well as it's link identifier.

Neighbor TLV

The Neighbor TLV is used by a BGP router to indicate its Hello adjacency state with its neighboring router(s) on the specific link. The neighbor is identified by its AS Number and BGP Identifier. The router MUST include the Neighbor TLV for each of its discovered neighbors on that link irrespective of its status.

Cryptographic Authentication TLV

The Cryptographic Authentication TLV is an optional TLV that is used as part of an authentication mechanism for BGP Hello message by securing against spoofing attacks.

Figure 8:
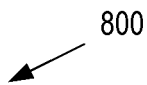
FIG. 8 is a transport options TLV used to convey sets of supported transport layers according to some embodiments.

FIG. 8 is a transport option TLV 800 used to convey sets of supported transport layer protocols according to some embodiments. The transport options TLV 800 is used in some embodiments of the BGP hello message 500 shown in FIG. 5 and the TLV format 700 shown in FIG. 7. The fields in the TLV are as follows:

Type: This field is set to the type value assigned for Transport Options TLV. In some embodiments, the value 0x8 is assigned to the Type field. Other embodiments allocate other available values. If the invention is standardized, then the value is reserved in IANA.

Length: This field encodes the total length of the Transport Elements 1 to n.

Transport Element 1 to Transport Element n: The list of transport protocols ordered by preferences. There could be several types of Transport elements, each type carrying information about a specific transport protocol type. The encoding of the Transport Element depends on the type. A Transport Element is encoded as 1-octet field that specifies the element type, and a variable length field that is the type-dependent element value.

Figure 9:
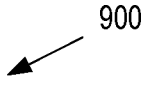
FIG. 9 is a generic transport element according to some embodiments.

FIG. 9 is a generic transport element 900 according to some embodiments. The generic transport element 900 is used in some embodiments of the transport options TLV 800 shown in FIG. 8. The generic transport element 900 is encoded as:

| Transport Element | Type | Value |
| --- | --- | --- |
| type name | Generic | 0x01 |

The value part has a 1-octet Protocol Type field. This field indicates a specific transport protocol type. The following types are used in some embodiments of the generic transport element 900:

1=TCP, 2=SCTP, 3=QUIC, 4=TLS.

Some transport protocol types can be assigned values in the range 4-255. Note that the selection of IP addresses to be used for establishing the transport connection of a protocol type encoded in Generic Transport Element 900 follows the conventional BGP Neighbor Discovery, which is as follows:

If Peering Address TLV is present, then it encodes the address(es) to be used for the sending BGP router when opening the BGP session's TCP connection. If this optional TLV is not present, the source address in the IP header of the BGP Hello Message should be used.

The same rules as described above are applicable to a Generic Transport Element 900. If Peering Address TLV is present, then it specifies the address(es) to be used for the sending BGP router when the opening connection(s) for the Protocol Type in Generic Transport Element 900. If Peering Address TLV is not present, then the source address of the IP header of the Hello Message should be used for the connection of the Protocol Type in Generic Transport Element 900.

Figure 10:
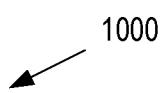
FIG. 10 is an alternate encoding of a transport options TLV according to some embodiments.

FIG. 10 is an alternate encoding of a transport options TLV 1000 according to some embodiments. The alternate encoding of the transport options TLV 1000 is used in some embodiments of the BGP hello message 500 shown in FIG. 5 and the TLV format 700 shown in FIG. 7. In the illustrated embodiment, the value field is a bit string and each Transport Protocol Type is assigned a specific bit position.

The preferences are implicit in the bit position assigned to the protocol in the transport options TLV 1000. For example, the higher the bit position, the higher the preference. In that case, BGP routers do not have flexibility to alter the relative preference of a protocol. For example, TCP is assigned bit pos 1, SCTP is assigned bit pos 2, TLS is assigned bit position 3, and QUIC is assigned bit pos 4. Consequently, QUIC always gets the higher preference with respect to TLS, SCTP and TCP protocols. The alternate encoding of the transport options TLV 1000 is simple and compact. A receiving BGP router performs a bit wise AND operation between the received Transport Bit String and the Transport Bit String included in the Hello messages sent out by the BGP router. The receiving BGP router then chooses the highest bit position as the transport protocol for the BGP session.

Figure 11:
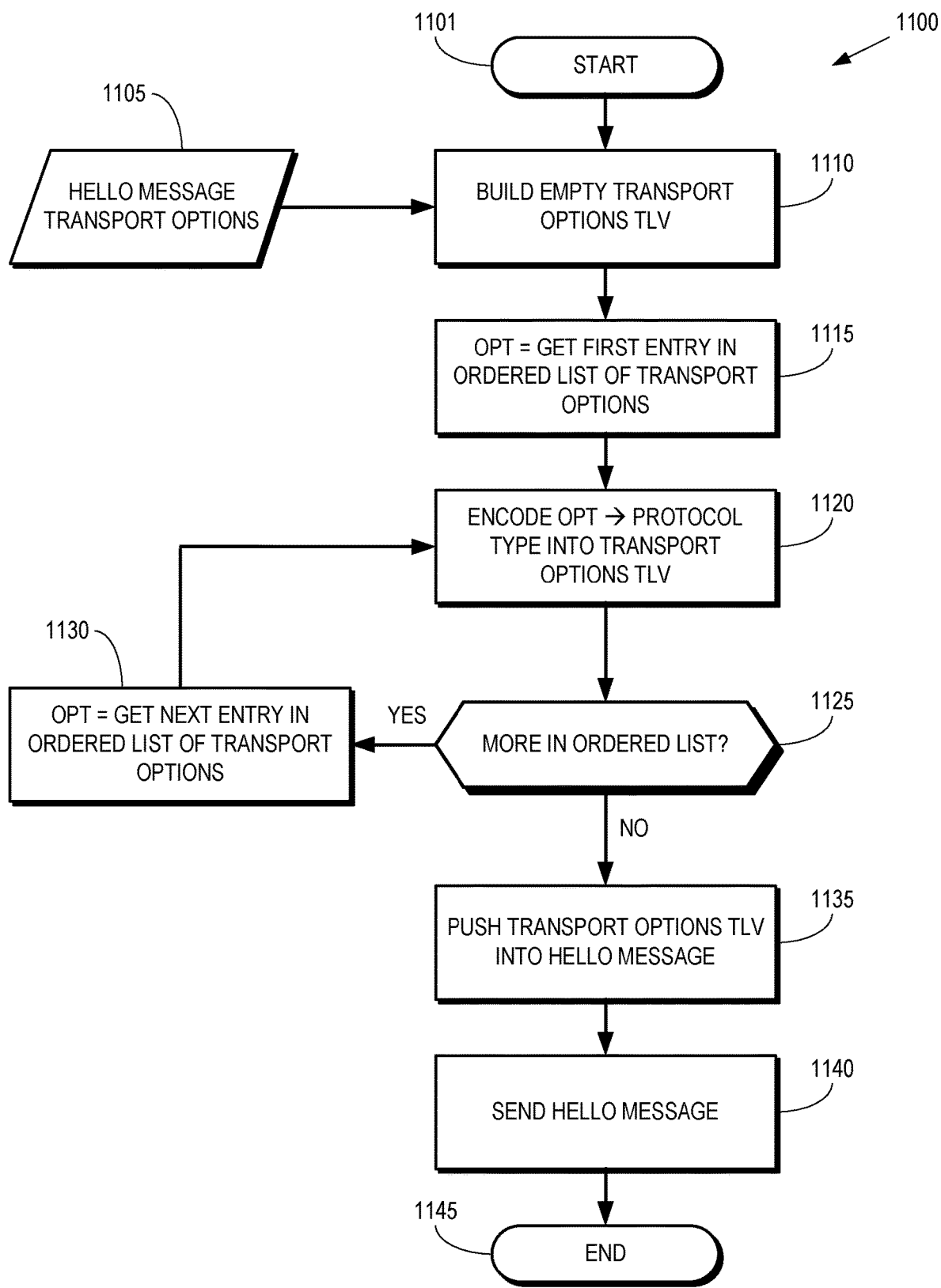
FIG. 11 is a flow diagram of a method of sending a transport options TLV in a BGP Hello message according to some embodiments.

FIG. 11 is a flow diagram of a method 1100 of sending a transport options TLV in a Hello message according to some embodiments. The method is implemented in routers such as routers in some embodiments of the communication system 100 shown in FIG. 1 and the communication system 200 shown in FIG. 2.

The method 1100 starts at the block 1101. The router receives input 1105 that includes a Hello message and a list of transport layer protocols supported by the router. In some embodiments, the list of transport protocols is ordered based on a preference or priority of the transport protocols. For example, the list of transport protocols can be presented in descending order of preference. The Hello message is encoded with other TLVs or parameters used for BGP neighbor discovery procedures, as applicable.

At block 1110, the router builds an empty transport options TLV. At block 1115, the router retrieves a first entry in the ordered list of transport protocols. At block 1120, the router encodes the protocol type into the value of the transport options TLV. The value is encoded as a transport element, a transport bitstring, or in another format.

At decision block 1125, the router determines whether there are additional entries in the ordered list of transport protocol options. If so, the method 1100 proceeds to the block 1130. If there are no additional entries in the ordered list, the method 1100 proceeds to the block 1135.

At block 1130, the router retrieves the next entry in the ordered list of transport protocols. The method 1100 then flows to the block 1120.

At block 1135, the router pushes the transport options TLV onto the hello message. At block 1140, the router sends the Hello message over the appropriate link or to a targeted peer BGP router. The method 1100 ends at block 1145.

During a Hello message exchange between a pair of peering BGP routers, if the first BGP router includes transport options TLV in Hello Message that it transmits to a second BGP router and then the first BGP router receives a Hello message from the second BGP router that does not include the transport options TLV, the first BGP router continues under the assumption that the second BGP router intends to use TCP as the transport protocol. Thus, the first BGP router operates as if the second BGP router transmitted a Transport Preferences TLV in its Hello message. Implementing the transport options TLV is therefore backward compatible with conventional BGP implementations. However, if the first BGP router has not encoded TCP as an option in Transport Options TLV then there are no common choices among the neighboring BGP routers and so no peering is possible. In that situation, if the second BGP router initiates a TCP connection request to the first BGP router then the first BGP router should reject the connection. If after a BGP session has become operational over the chosen transport protocol and a BGP router detects that the peering BGP router has modified the transport options in its Hello messages, then the BGP router re-evaluates the preferences. If the chosen protocol after reevaluation is different from the currently active protocol, then no action should be taken by either of the BGP routers. The new protocol is adopted after the current BGP session is terminated due to operational failures or by administrative action.

Figure 12:
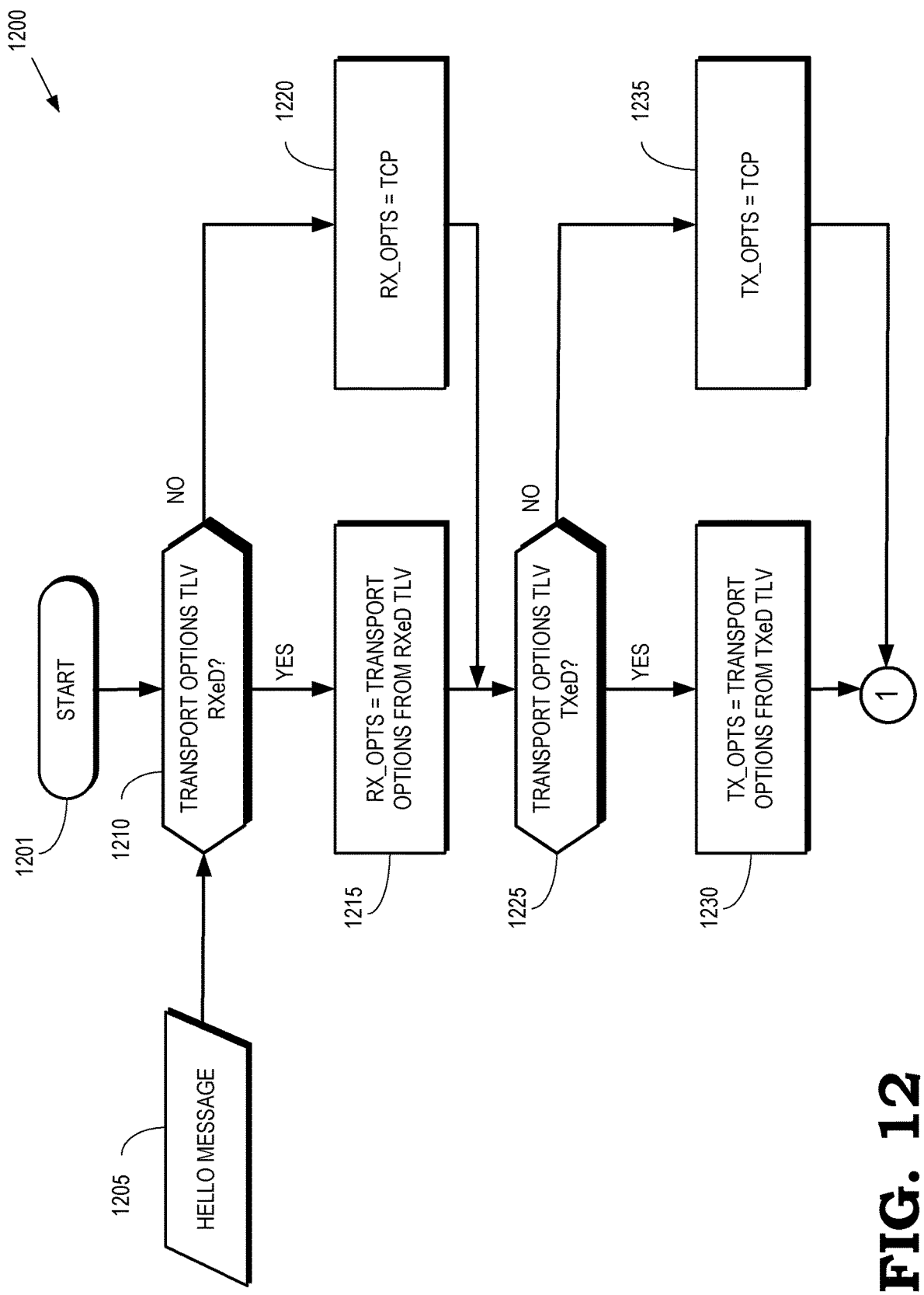
FIG. 12 is a flow diagram of a first portion of a method of processing a transport options TLV included in a BGP Hello message received from a peering BGP router according to some embodiments.

FIG. 12 is a flow diagram of a first portion of a method 1200 of processing a transport options TLV included in a Hello message received from a peering BGP router according to some embodiments. The method 1200 is implemented in routers such as routers in some embodiments of the communication system 100 shown in FIG. 1 and the communication system 200 shown in FIG. 2. The method 1200 is implemented using some embodiments of the Hello message 500 shown in FIG. 5. However, other embodiments of the method 1200 are implemented using alternate encodings as discussed herein.

The method 1200 starts at the block 1201. The router receives input 1205 that includes a Hello message received from a peering BGP router.

At decision block 1210, the router determines whether the transport options TLV is included in the received Hello message. If so, the method 1200 flows to the block 1215. Otherwise, the method 1200 flows to the block 1220.

At block 1215, the router extracts the received ordered list of transport protocols from the received transport options TLV. The method 1200 then flows to the decision block 1225.

At block 1220, the router creates a pseudo-list that represents an ordered list of transport protocols that only includes TCP as a transport protocol option because no transport options TLV was received from the peering BGP router. The method then flows to the decision block 1225.

At decision block 1225, the router determines whether a transport options TLV is included in the Hello messages transmitted by the router. If so, the method 1200 flows to the block 1230. Otherwise, the method 1200 flows to the block 1235.

At block 1230, the router extracts the transmitted ordered list of transport protocols from the transport options TLV in the Hello message that was transmitted to the peering BGP router. The method 1200 then flows to the node 1, which connects to the node 1 in FIG. 13.

At block 1235, the router creates a pseudo-list that represents an ordered list of transport protocols that only includes TCP as a transport protocol option because no transport options TLV was transmitted to the peering BGP router. The method 1200 then flows to the node 1, which connects to the node 1 in FIG. 13.

Figure 13:
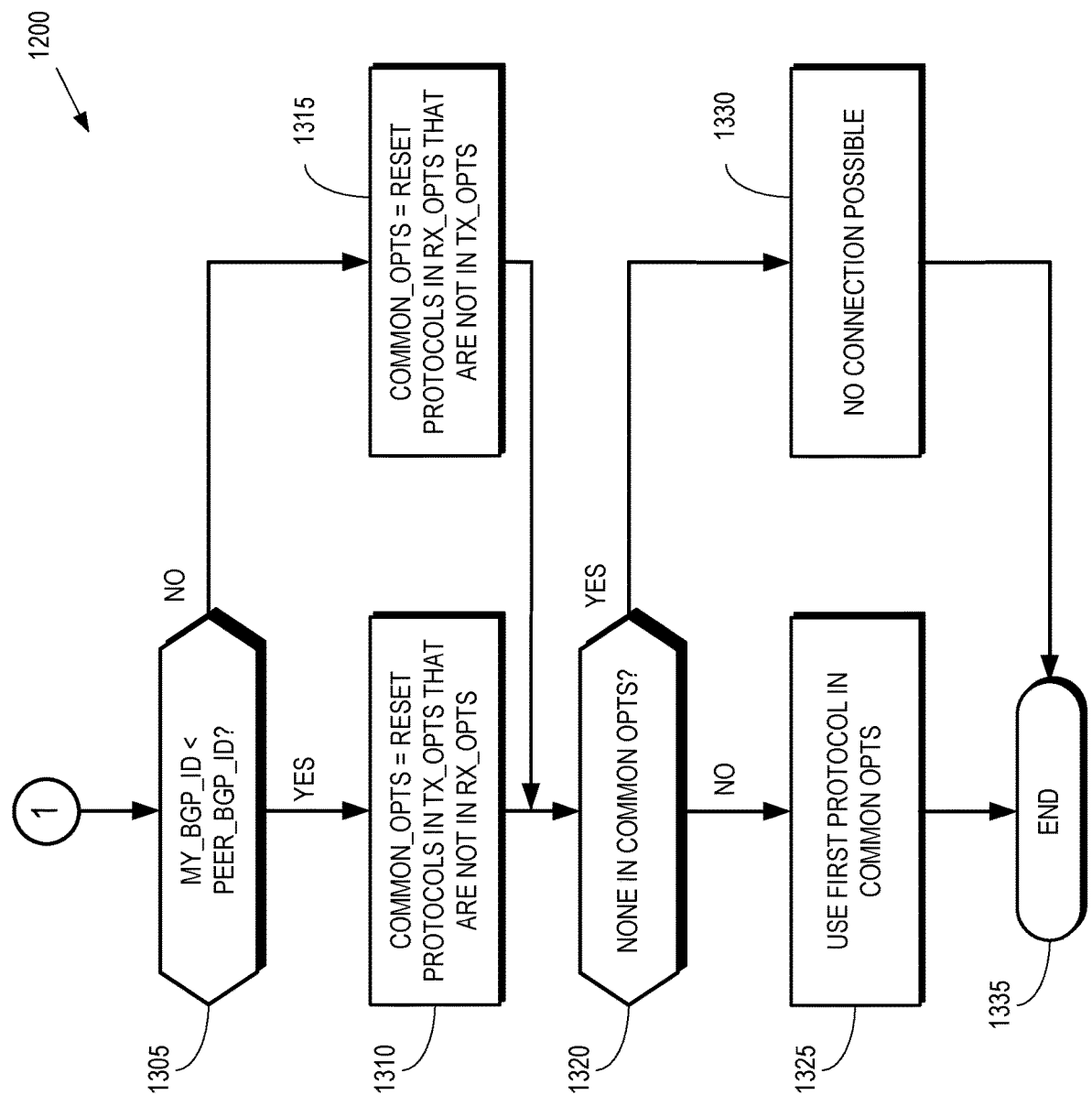
FIG. 13 is a flow diagram of a second portion of the method of processing the transport options TLV included in the BGP Hello message received from the peering BGP router according to some embodiments.

FIG. 13 is a flow diagram of a second portion of the method 1200 of processing the transport options TLV included in the Hello message received from the peering BGP router according to some embodiments. Decision block 1305 connects to the blocks 1230, 1235 in FIG. 12 via the node 1.

At decision block 1305, the router determines whether the BGP identifier of the router is lower than the BGP identifier of the peering BGP router. The BGP identifier is encoded in the hello messages exchanged by the router and the peering BGP router. If so, the ordered list of transport protocols transmitted by the router is the basis of the negotiation for the transport protocol used by the BGP session and the method 1300 flows to the block 1310. If the BGP identifier of the router is higher than the BGP identifier of the peering the GPU router, then the ordered list of transport protocols received from the peering BGP router is the basis of negotiation for the transport protocol and the method 1300 flows to the block 1315.

At block 1310, the router computes the common transport options by identifying the transport protocols that are not common to the transmitted and received ordered lists of transport protocols. The router then resets the protocols in the transmitted ordered list that are not common to the transmitted/received ordered lists of transport protocols. The method 1300 then flows to the decision block 1320.

At block 1315, the router computes the common transport options by identifying the transport protocols that are not common to the transmitted and received ordered lists of transport protocols. The router then resets the protocols in the received ordered list that are not common to the transmitted/received ordered lists of transport protocols. The method 1300 then flows to decision block 1320.

At decision block 1320, the router determines whether there are no transport protocols shared by the ordered list transmitted by the router and the ordered list received from the peering BGP router. If there is at least one transport protocol common to the transmitted/received ordered lists, the method 1300 flows to the block 1325. Otherwise, the method flows to the block 1330.

At the block 1325, the router selects the common transport protocol having the highest preference or priority as the transport protocol for the BGP session between the router and the peering BGP router. For example, the router can select the first protocol in the ordered list of protocols that are shared by the transmitted and received ordered lists. The method 1300 then flows to the block 1335 and the method 1300 ends.

At block 1330, the router determines that a connection is not possible because there are no common transport protocols between the router and the peering BGP router, i.e., the sets of transport options indicated in the transmitted ordered list is mutually exclusive to the set of transport options indicated in the received ordered list. The method 1300 then flows to the block 1335 and the method 1300 ends.

Figure 14:
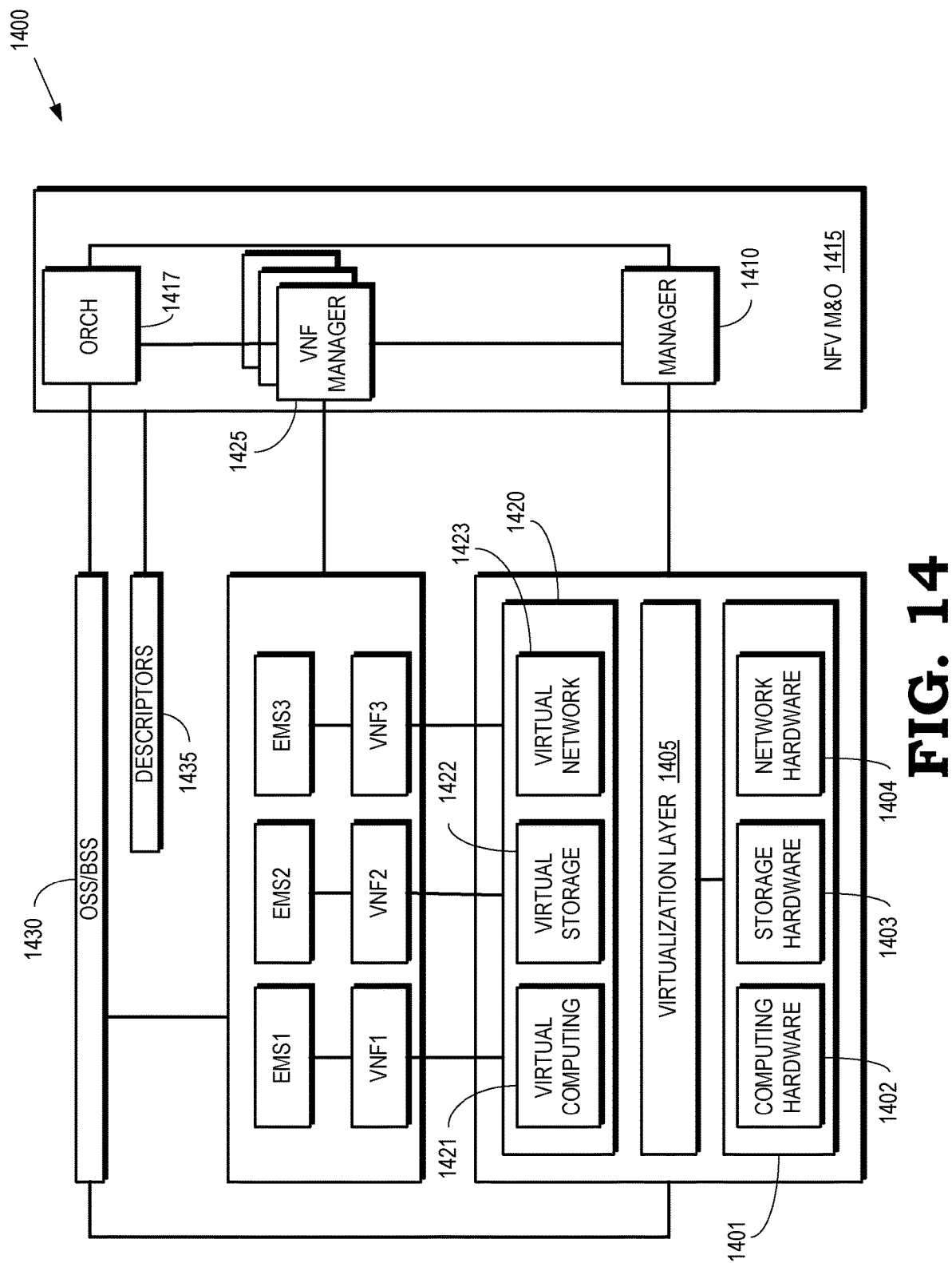
FIG. 14 is a block diagram of a network function virtualization (NFV) architecture that supports multiple transport layer protocols for BGP sessions according to some embodiments.

FIG. 14 is a block diagram of a network function virtualization (NFV) architecture 1400 that supports multiple transport layer protocols for BGP sessions according to some embodiments. The NFV architecture 1400 is used to implement some embodiments of the network 100 shown in FIG. 1 and the clean acacia system 200 shown in FIG. 2. The NFV architecture 1400 includes hardware resources 1401 including computing hardware 1402, storage hardware 1403, and network hardware 1404. The computing hardware 1402 is implemented using one or more processors, the storage hardware 1403 is implemented using one or more memories, and the network hardware 1404 is implemented using one or more transceivers, transmitters, receivers, interfaces, and the like.

A virtualization layer 1405 provides an abstract representation of the hardware resources 1401. The abstract representation supported by the virtualization layer 1405 can be managed using a virtualized infrastructure manager 1410, which is part of the NFV management and orchestration (M&O) module 1415. Some embodiments of the manager 1410 are configured to collect and forward performance measurements and events that may occur in the NFV architecture 1400. For example, performance measurements may be forwarded to an orchestrator (ORCH) 1417 implemented in the NFV M&O 1415. The hardware resources 1401 and the virtualization layer 1405 may be used to implement virtual resources 1420 including virtual computing resources 1421, virtual storage resources 1422, and virtual networking resources 1423.

Virtual networking functions (VNF1, VNF2, VNF3) run over the NFV infrastructure (e.g., the hardware resources 1801) and utilize the virtual resources 1420. For example, the virtual networking functions (VNF1, VNF2, VNF3) may be implemented using virtual machines supported by the virtual computing resources 1421, virtual memory supported by the virtual storage resources 1422, or virtual networks supported by the virtual network resources 1423. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 1425 that exchanges information and coordinates actions with the manager 1410 or the orchestrator 1417.

The NFV architecture 1400 may include an operation support system (OSS)/business support system (BSS) 1430. The OSS/BSS 1430 deals with network management including fault management using the OSS functionality. The OSS/BSS 1430 also deals with customer and product management using the BSS functionality. Some embodiments of the NFV architecture 1400 use a set of descriptors 1435 for storing descriptions of services, virtual network functions, or infrastructure supported by the NFV architecture 1400. Information in the descriptors 1435 may be updated or modified by the NFV M&O 1415.

The NFV architecture 1400 implements network slices that provide control plane functions or user plane functions. A network slice is a complete logical network that provides communication services and network capabilities, which can vary from slice to slice. User equipment can concurrently access multiple slices that support multiple service flows between a core network and the user equipment. Some embodiments of user equipment provide Network Slice Selection Assistance Information (NSSAI) parameters to the network to assist in selection of a slice instance for the user equipment. A single NSSAI may lead to the selection of several slices. The NFV architecture 1800 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
 a) hardware-only circuit implementations (such as implementations and only analog and/or digital circuitry) and
 b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
 c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
    determining, based on exchanging of information identifying first and second sets of transport layer protocols supported by first and second routers, respectively, a subset of transport layer protocols supported by the first and second routers, wherein the exchanging of information includes at least one of:
        transmitting, from the first router, a first message comprising the information identifying the first set of transport layer protocols supported by the first router; or
        receiving, at the first router, a second message comprising the information identifying the second set of transport layer protocols supported by the second router;
    selecting, from the subset of transport layer protocols, a common transport layer protocol supported by the first and second routers, wherein selecting the common transport layer protocol comprises ordering the first and second sets of transport layer protocols based on preferences of the first and second routers, respectively; and
    establishing, at the first router, a border gateway protocol (BGP) session with the second router over the common transport layer protocol.

2. The method of claim 1, wherein selecting the common transport layer protocol comprises selecting a highest preference transport layer protocol in the subset of transport layer protocols supported by the first and second routers.

3. The method of claim 2, wherein the first and second routers are prioritized based on first and second identifiers, respectively.

4. The method of claim 3, wherein selecting the common transport layer protocol comprises selecting the common transport layer protocol at a highest priority router of the first and second routers.

5. The method of claim 4, wherein the first router is the highest priority router, and wherein the first router selects the highest preference transport layer protocol in the subset of transport layer protocols as the common transport layer protocol.

6. The method of claim 1, wherein establishing the BGP session comprises configuring the BGP session based on parameters of the common transport layer protocol.

7. The method of claim 6, wherein configuring the BGP session comprises mapping streams of the common transport layer protocol to at least one of a network layer reachability information (NLRI) type, a feature, or a characteristic of information conveyed by the BGP session.

8. The method of claim 1, wherein transmitting the first message comprises unicasting the first message to the second router.

9. The method of claim 8, wherein unicasting the first message comprises unicasting the first message to the second router via a single hop or multiple hops using a targeted message.

10. The method of claim 1, wherein transmitting the first message comprises broadcasting or multicasting the second first message over a plurality of links to a plurality of routers comprising the second router.

11. A first router, comprising:
    a transceiver configured to transmit a first message comprising information identifying a first set of transport layer protocols supported by the first router and receive a second message comprising information identifying a second set of transport layer protocols supported by a second router; and
    a processor configured to:
        determine, based on the information identifying the first and second sets of transport layer protocols supported by the first and second routers, respectively, a subset of transport layer protocols supported by the first and second routers;
        select, from the subset of transport layer protocols, a common transport layer protocol supported by the first and second routers, wherein the first and second sets of transport layer protocols are ordered based on preferences of the first and second routers, respectively, and
        establish a border gateway protocol (BGP) session with the second router over the common transport layer protocol.

12. The first router of claim 11, wherein a highest preference transport layer protocol is selected from the subset of transport layer protocols supported by the first and second routers.

13. The first router of claim 12, wherein the first and second routers are prioritized based on first and second identifiers, respectively.

14. The first router of claim 13, wherein the common transport layer protocol is selected by a highest priority router of the first and second routers.

15. The first router of claim 14, wherein the first router is the highest priority router, and wherein the processor selects the highest preference transport layer protocol in the subset of transport layer protocols as the common transport layer protocol.

16. The first router of claim 11, wherein the processor configures the BGP session based on parameters of the common transport layer protocol.

17. The first router of claim 16, wherein the processor maps streams of the BGP session to at least one of a network layer reachability information (NLRI) type, a feature, or a characteristic of information conveyed by the BGP session.

18. The first router of claim 11, wherein the transceiver is configured to unicast the first message to the second router.

19. The first router of claim 18, wherein the transceiver is configured to unicast the first message to the second router via a single hop or multiple hops in a targeted message.

20. The first router of claim 11, wherein the transceiver is configured to broadcast or multicast the first message over a plurality of links to a plurality of routers comprising the second router.

21. An apparatus comprising:
at least one processor; and
at least one memory storing instructions that, when executed by the at least one processor, cause the apparatus at least to perform:
determining, based on exchanging of information identifying first and second sets of transport layer protocols supported by first and second routers, respectively, a subset of transport layer protocols supported by the first and second routers, wherein the exchanging of information includes at least one of:
transmitting, from the first router, a first message comprising the information identifying the first set of transport layer protocols supported by the first router; or
receiving, at the first router, a second message comprising the information identifying the second set of transport layer protocols supported by the second router;
selecting, from the subset of transport layer protocols, a common transport layer protocol supported by the first and second routers, wherein selecting the common transport layer protocol comprises ordering the first and second sets of transport layer protocols based on preferences of the first and second routers, respectively; and
establishing a border gateway protocol (BGP) session with the second router over the common transport layer protocol.

* * * * *

UNITED STATES PATENT AND TRADEMARK OFFICE
CERTIFICATE OF CORRECTION

PATENT NO. : 11,770,465 B2  
APPLICATION NO. : 17/075471  
DATED : September 26, 2023  
INVENTOR(S) : Pranjal Kumar Dutta Page 1 of 1

It is certified that error appears in the above-identified patent and that said Letters Patent is hereby corrected as shown below:

In the Claims

Claim 10, Column 18, Line 39: After "the" delete "second".

Signed and Sealed this  
Twenty-second Day of October, 2024

Katherine Kelly Vidal  
*Director of the United States Patent and Trademark Office*